US012467483B2

(12) United States Patent
Coretto et al.

(10) Patent No.: US 12,467,483 B2
(45) Date of Patent: Nov. 11, 2025

(54) VALVE SYSTEM

(71) Applicant: Hamilton Sundstrand Corporation, Charlotte, NC (US)

(72) Inventors: August M. Coretto, Manchester, CT (US); Francis P. Marocchini, Somers, CT (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 147 days.

(21) Appl. No.: 18/228,601

(22) Filed: Jul. 31, 2023

(65) Prior Publication Data

US 2025/0043804 A1 Feb. 6, 2025

(51) Int. Cl.
*F15B 13/044* (2006.01)

(52) U.S. Cl.
CPC ..... *F15B 13/044* (2013.01); *F15B 2211/3059* (2013.01)

(58) Field of Classification Search
CPC ............. Y10T 137/8593; F15B 13/044; F15B 2211/3059; F15B 11/16; F15B 20/008; F15B 2211/329; F15B 2211/7142
See application file for complete search history.

(56) References Cited

U.S. PATENT DOCUMENTS 3,304,633 A * 2/1967 Hein ..................... E02F 3/6481 280/492
3,886,843 A * 6/1975 Hoffmann ............... F15B 11/16 89/129.01
4,204,457 A 5/1980 Cyrot
4,930,401 A 6/1990 Cameron et al.
5,353,685 A 10/1994 Snow
5,397,173 A 3/1995 Bourguet
6,637,199 B2 10/2003 Spickard
8,096,321 B2 1/2012 Goll
9,657,756 B2 5/2017 Bostiga et al.
11,028,862 B2 * 6/2021 Pogatschnigg ....... E02F 9/2296
2017/0274930 A1 * 9/2017 Zhang ................... F15B 13/025
2018/0002028 A1 1/2018 Polcuch
2022/0290406 A1 * 9/2022 Kumagai ............. E02F 9/2285

FOREIGN PATENT DOCUMENTS

CN 112709730 A 4/2021
CN 116221232 A 6/2023
EP 4215762 A1 7/2023

OTHER PUBLICATIONS

Extended European Search Report for EP Application No. 24191431.6, Dated Nov. 28, 2024, pp. 10.

* cited by examiner

*Primary Examiner* — Jessica Cahill
(74) *Attorney, Agent, or Firm* — Kinney & Lange, P.A.

(57) ABSTRACT

A system can include a first controllable valve configured to output a first control pressure on one or more first pressure control lines, a second controllable valve configured to output a second control pressure on one or more second pressure control lines, and a valve assembly. The valve assembly can be configured to direct the first control pressure to a first functional system and the second control pressure to a second functional system in a first state, direct the first control pressure to both of the first functional system and the second functional system in a second state, and direct the second control pressure to both of the first functional system and the second functional system in a third state.

20 Claims, 3 Drawing Sheets

VALVE SYSTEM

FIELD

This disclosure relates to valve systems.

BACKGROUND

There is a need for new backup transfer systems to support split control effector actuators that share a common backup. A traditional transfer valve only has two positions. A multi-valve system allows three modes while still only using two position valves so that the needs for springs and seal wear concerns are mitigated. Traditionally, actuator systems have a manifold, transfer valve, two control EHSVs and a transfer EHSV/solenoid for each set of controlled actuators.

Such conventional methods and systems have generally been considered satisfactory for their intended purpose. However, there is still a need in the art for improved backup transfer systems for split control effector actuators. The present disclosure provides a solution for this need.

SUMMARY

A system can include a first controllable valve configured to output a first control pressure on one or more first pressure control lines and a second controllable valve configured to output a second control pressure on one or more second pressure control lines. The system can also include a first shutoff valve in fluid communication with the first controllable valve via the one or more first pressure control lines such that the first shutoff valve is connected to one or more first pressure output lines. The first shutoff valve can be configured to move between a first valve open position such that the first shutoff valve is configured to fluidly communicate the one or more first pressure control lines with the one or more first pressure output lines and a first valve closed position such that the first shutoff valve is configured to restrict fluid communication of the one or more first pressure control lines with the one or more first pressure output lines.

The system can further include a second shutoff valve in fluid communication with the second controllable valve via the one or more second pressure control lines such that the second shutoff valve is connected to one or more second pressure output lines. The second shutoff valve can be configured to move between a second valve open position such that the second shutoff valve is configured to fluidly communicate the one or more second pressure control lines with the one or more second pressure output lines and a second valve closed position such that the second shutoff valve is configured to restrict fluid communication of the one or more second pressure control lines with the one or more second pressure output lines.

The system can further include a transfer valve in fluid communication between the one or more first pressure output lines and the one or more second pressure output lines. The transfer valve can be configured to move between a first transfer valve position such that the transfer valve is configured to restrict fluid communication between the one or more first pressure output lines and the one or more second pressure output lines and a second transfer valve position such that the transfer valve is configured to fluidly communicate the one or more first pressure output lines with the one or more second pressure output lines.

In certain embodiments, the system can further include a transfer control system configured to control a position of the first shutoff valve between the first valve open position and the first valve closed position, a position of the second shutoff valve between the second valve open position and the second valve closed position, and a position of the transfer valve between the first transfer valve position and the second transfer valve position. The transfer control system can include a first transfer control valve configured to provide a transfer control pressure to one or more first transfer pressure control lines to control the first shutoff valve and a second transfer control valve configured to provide a second transfer control pressure to one or more second transfer pressure control lines to control the second shutoff valve.

In certain embodiments, the transfer control system can further include a controller configured to control the first transfer control valve and/or the second transfer control valve to change the position of the transfer valve along with one of the first shutoff valve and the second shutoff valve. In a first mode, the controller can be configured to control the first transfer control valve to cause the first shutoff valve to be in the first valve open position to fluidly communicate the one or more first pressure control lines to a first functional system, the second transfer control valve to cause the second shutoff valve to be in the second valve open position to fluidly communicate the one or more second control lines to a second functional system, and the transfer valve to be in the first transfer valve position to prevent fluid communication between the one or more first pressure control lines and the one or more second pressure control lines.

In a second mode, the controller can be configured to control the first transfer control valve to cause the first shutoff valve to be in the first valve closed position and to prevent fluid communication between the one or more first pressure control lines and the first functional system, the transfer valve to be in the second transfer valve position to fluidly communicate the one or more second pressure control lines to the first functional system via the one more first pressure output lines, and the second transfer valve to cause the second shutoff valve to be in the second valve open position to fluidly communicate the one or more second pressure control lines to the second functional system.

In a third mode, the controller can be configured to control the first transfer valve to cause the first shutoff valve to be in the first valve open position to fluidly communicate the one or more first pressure control lines to the first functional system, the second transfer valve to cause the second shutoff valve to be in the second valve closed position to prevent fluid communication between the one or more second pressure control lines and the second functional system, and the transfer valve to be in the second transfer valve position to fluidly communicate the one or more first pressure control lines to the second functional system via the one or more second pressure output lines.

In certain embodiments, the transfer valve can be configured to block pressure between the one or more first pressure output lines and the one or more second pressure output lines. In certain embodiments, the first controllable valve and the second controllable valve are electro-hydraulic servo valves (EHSVs). In certain embodiments, the first transfer control valve can be a first solenoid and the second transfer control valve can be a second solenoid.

In certain embodiments, the system can further include an intermediate control line between the one or more first transfer pressure control lines and the one or more second transfer pressure control lines such that the one or more first transfer pressure control lines are connected to a first portion of the first shutoff valve to provide the first control pressure to the first portion of the first shutoff valve, the one or more second transfer pressure control lines are connected to a first portion of the second shutoff valve to provide the second control pressure to the first portion of the second shutoff valve, and the intermediate control line is connected to a first portion of the transfer valve to provide the transfer control pressure to the first portion of the transfer valve.

In certain embodiments, the system can further include one or more input lines in fluid communication with the first shutoff valve and the second shutoff valve configured to be at a supply pressure. The system can also include an input orifice in fluid communication with and disposed between the one or more input lines and the intermediate control line such that the input orifice is configured to restrict flow between the one or more input lines and the intermediate control line. The system can also include a first control orifice in fluid communication with and disposed between the intermediate control line and the one or more first transfer pressure control lines such that the first control orifice is configured to restrict flow between the intermediate control line and the one or more first transfer pressure control lines. The system can further include a second control orifice in fluid communication with and disposed between the intermediate control line and the one or more second transfer pressure control lines such that the second control orifice is configured to restrict flow between the intermediate control line and the one or more second transfer pressure control lines.

In certain embodiments, the system can further include one or more return control lines. The first solenoid can be in fluid communication with and disposed between the one or more first transfer pressure control lines and the one or more return lines and configured to selectively communicate the one or more first transfer control lines and the one or more return lines. The second solenoid can be in fluid communication with and disposed between the one or more second transfer pressure control lines and the one or more return control lines and configured to selectively communicate the one or more second transfer control lines and the one or more return lines.

In certain embodiments, the controller can be configured to command the first solenoid and the second solenoid to be in a first state in the first mode, the first solenoid to be in a second state and the second solenoid to be in the first state in the second mode, and the second solenoid to be in the second state and the first solenoid to be in the first state in the third mode. The first state can be a closed state and the second state can be an open state, such that in the first mode, the first solenoid and the second solenoid are in the closed state and the one or more first transfer control pressure lines, the one or more second transfer control pressure lines, and the intermediate control line are all at a supply pressure from the one or more input lines thereby holding the first shutoff valve in the first valve open position, the second shutoff valve in the second valve open position, and the transfer valve in the first transfer valve position.

In the second mode, the first solenoid can be in the open state and the second solenoid can be in the closed state, such that the one or more first transfer control lines are in fluid communication with the return line and at a return pressure of the return line causing the first shut off valve to move to the first valve closed position, and the one or more second transfer pressure control lines and the intermediate control line are at an intermediate pressure configured to hold the second shutoff valve in the second valve open position but to cause the transfer valve to move to the second transfer valve position.

In the third mode, the first solenoid can be in the closed stated and the second solenoid can be in the open state, such that the one or more first transfer pressure control lines and the intermediate pressure control line are at the intermediate pressure and the one or more second transfer control lines are at the return pressure of the return line causing the first shutoff valve to move to the first valve open position, the second shutoff valve to move to the second valve closed position, and the transfer valve to move to the second transfer valve position.

In certain embodiments, the first functional system and the second functional system can each include a plurality of actuators. In certain embodiments, the supply pressure can be a high pressure, the return pressure can be a low pressure, and the intermediate pressure can be between the supply pressure and the return pressure.

In certain embodiments, the first shutoff valve can include a first shutoff valve housing comprising. The first shutoff valve housing can include one or more first functional system ports configured to fluidly connect to the one or more first pressure output lines, one or more the first shutoff valve ports configured to fluidly connect to the one or more first pressure control lines, and a first shutoff valve spool having a first end with a first area and a second end with a second area such that the first area is greater than the second area. The first end can be in fluid communication with the first transfer pressure control line and the second end can be in fluid communication with a biasing pressure. The first shutoff valve spool can be configured to move within the first shutoff valve housing between the first open position and the first closed position to selectively communicate the one or more first functional system ports with the one or more first shutoff valve ports as a function of a pressure differential between the first area and the second area of the first shutoff valve. When the first area of the first shutoff valve is at the supply pressure or the intermediate pressure, the first shutoff valve can be configured to be in the first open position and when the first area of the first shutoff valve is at the return pressure the first shutoff valve can be configured to be in the first closed position.

In certain embodiments, the second shutoff valve can includes a second shutoff valve housing. The second shutoff valve housing can include one or more second functional system ports configured to fluidly connect to the one or more second pressure output lines, one or more the second shutoff valve ports configured to fluidly connect to the one or more second pressure control lines, and a second shutoff valve spool having a first end with a first area and a second end with a second area such that the first area is greater than the second area. The first end can be in fluid communication with the second transfer pressure control line and the second end can be in fluid communication with the biasing pressure. The second shutoff valve spool can be configured to move within the second shutoff valve housing between the second open position and the second closed position to selectively communicate the one or more second functional system ports with the one or more second shutoff valve ports as a function of a pressure differential between the first area and the second area of the second shutoff valve such that when the first area of the second shutoff valve is at the supply pressure and the intermediate pressure the second shutoff valve is in the first open position and when the first area of the second shutoff valve is at the low pressure the first shutoff valve is in the first closed position.

In certain embodiments, the transfer valve can include a transfer valve housing. The transfer valve housing can include one or more transfer control ports configured to connect to the one or more transfer pressure control lines to be in fluid communication with the transfer control valve and a transfer valve spool having a first end with a first area and a second end with a second area such that the first area is greater than the second area. The first end can be in fluid communication with the intermediate line and the second end can be in fluid communication with the biasing pressure. The transfer valve spool can be configured to move within the transfer valve housing between the second transfer valve position and the second transfer position to selectively communicate the one or more first functional system ports with the one or more second shutoff valve ports or the one or more second functional system ports with the one or more first shutoff valve ports as a function of a pressure differential between the first area and the second area of the transfer valve such that when the first area of the transfer valve is at the supply pressure the transfer valve is in the first transfer valve position and when the first area of the transfer valve is at the intermediate and low pressure the transfer valve is in the second transfer valve position.

In accordance with at least one aspect of this disclosure, a system can include a first controllable valve configured to output a first control pressure on one or more first pressure control lines, a second controllable valve configured to output a second control pressure on one or more second pressure control lines, and a valve assembly. The valve assembly can be configured to direct the first control pressure to a first functional system and the second control pressure to a second functional system in a first state, direct the first control pressure to both of the first functional system and the second functional system in a second state, and direct the second control pressure to both of the first functional system and the second functional system in a third state. In certain embodiments, the transfer control system can be configured to control the valve assembly to be in one of the first state, the second state, or the third state.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
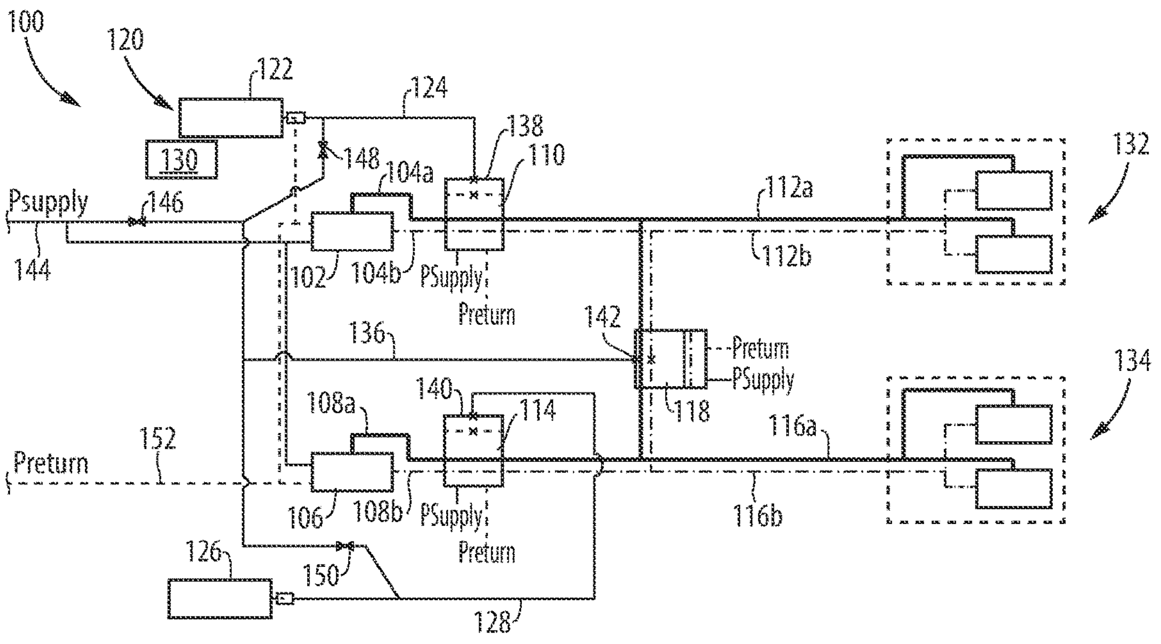
FIG. 1 is a schematic view of an embodiment of a system in accordance with this disclosure, shown in an embodiment of a first mode.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6.

Figure 2:
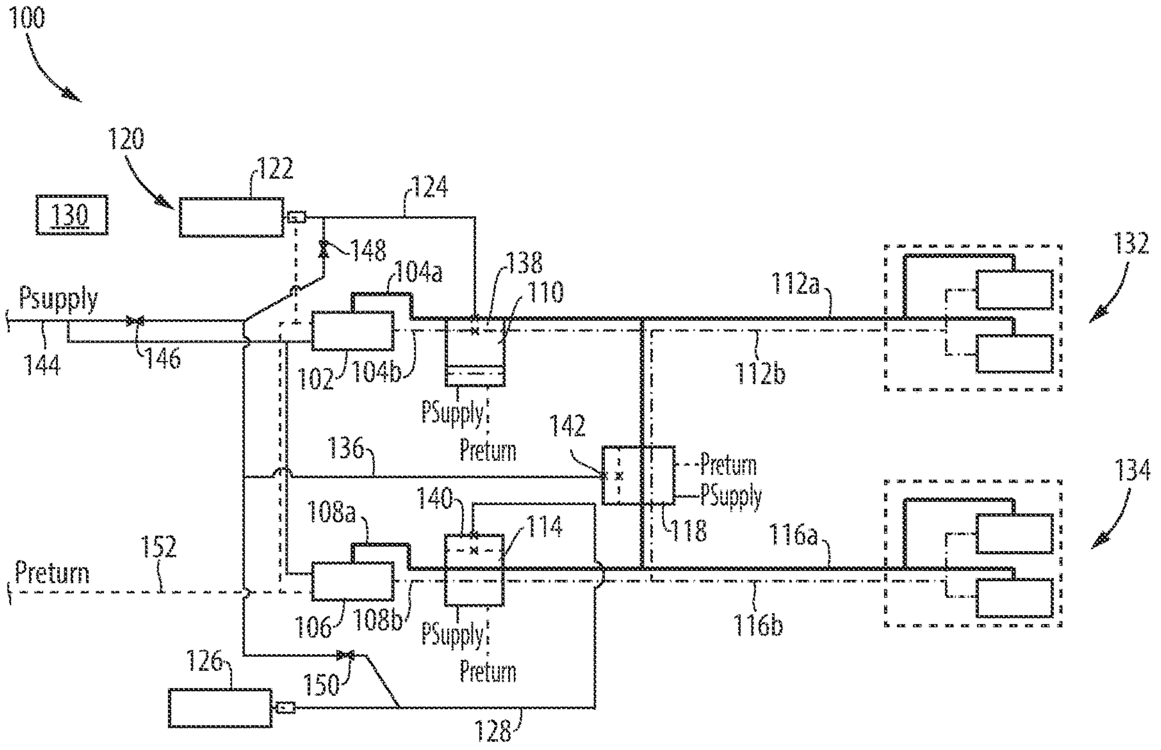
FIG. 2 is a schematic view of an embodiment of FIG. 1, shown in an embodiment of a second mode.
Figure 3:
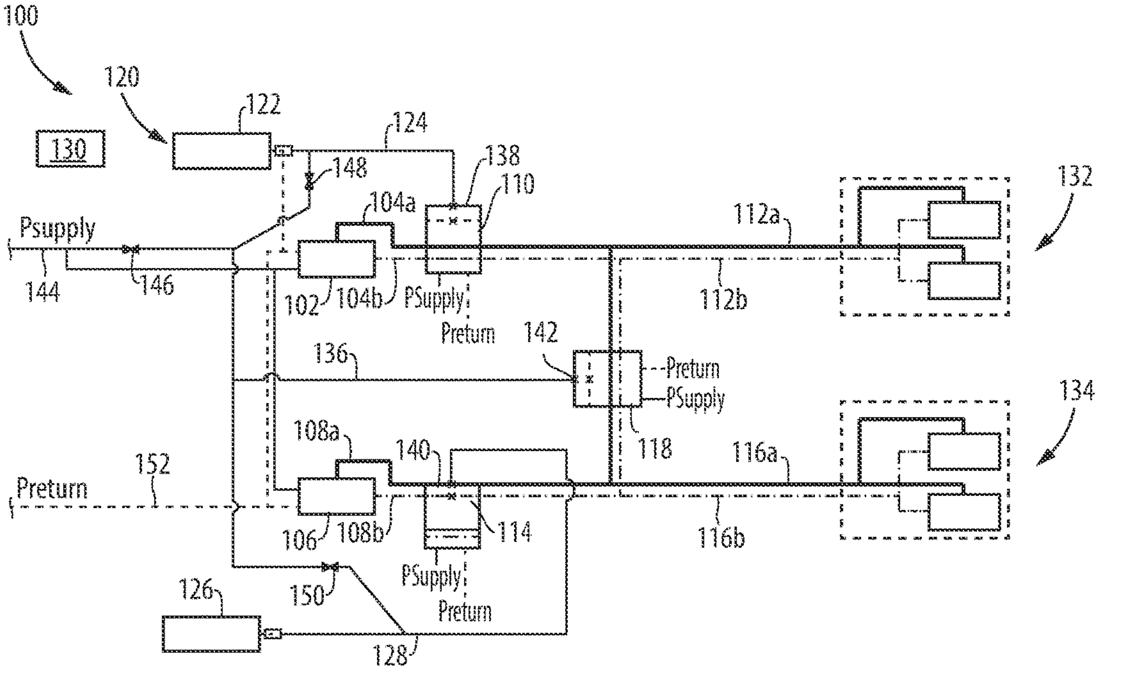
FIG. 3 is a schematic view of an embodiment of FIG. 1, shown in an embodiment of a third mode.

With reference to FIGS. 1-3, a system 100 can include a first controllable valve 102 configured to output a first control pressure on one or more first pressure control lines 104*a*, 104*b* and a second controllable valve 106 configured to output a second control pressure on one or more second pressure control lines 108*a*, 108*b*. The system 100 can also include a first shutoff valve 110 in fluid communication with the first controllable valve 102 via the one or more first pressure control lines 104*a*, 104*b* such that the first shutoff valve 110 is connected to one or more first pressure output lines 112*a*, 112*b*. The first shutoff valve 110 can be configured to move between a first valve open position (e.g., as shown in FIGS. 1 and 3) such that the first shutoff valve 110 is configured to fluidly communicate the one or more first pressure control lines 104*a*, 104*b* with the one or more first pressure output lines 112*a*, 112*b* and a first valve closed position (e.g., as shown in FIG. 2) such that the first shutoff valve 110 is configured to restrict (e.g., to completely block communication) fluid communication of the one or more first pressure control lines 104*a*, 104*b* with the one or more first pressure output lines 112*a*, 112*b*.

With continued reference to FIGS. 1-3, the system 100 can further include a second shutoff 114 valve in fluid communication with the second controllable valve 106 via the one or more second pressure control lines 108*a*, 108*b* such that the second shutoff valve 114 is connected to one or more second pressure output lines 116*a*, 116*b*. The second shutoff valve 114 can be configured to move between a second valve open position (e.g., as shown in FIGS. 1 and 2) such that the second shutoff valve 114 is configured to fluidly communicate the one or more second pressure control lines 106*a*, 106*b* with the one or more second pressure output lines 116*a*, 116*b* and a second valve closed position (e.g., as shown in FIG. 3) such that the second shutoff valve 114 is configured to restrict (e.g., to completely block communication) fluid communication of the one or more second pressure control lines 108*a*, 108*b* with the one or more second pressure output lines 116*a*, 116*b*.

With continued reference to FIGS. 1-3, the system 100 can further include a transfer valve 118 in fluid communication between the one or more first pressure output lines 112*a*, 112*b* and the one or more second pressure output lines 116*a*, 116*b*. The transfer valve 118 can be configured to move between a first transfer valve position (e.g., as shown in FIG. 1) such that the transfer valve is configured to restrict (e.g., to completely block communication) fluid communication between the one or more first pressure output lines 112*a*, 112*b* and the one or more second pressure output lines 116*a*, 116*b* and a second transfer valve position (e.g., as shown in FIGS. 2 and 3) such that the transfer valve 118 is configured to fluidly communicate the one or more first pressure output lines 112*a*, 112*b* with the one or more second pressure output lines 116*a*, 116*b*.

In certain embodiments, the system 100 can further include a transfer control system 120 configured to control a position of the first shutoff valve 110 between the first valve open position (e.g., as shown in FIGS. 1 and 3) and the first valve closed position (e.g., as shown in FIG. 2), a position of the second shutoff valve 114 between the second valve open position (e.g., as shown in FIGS. 1 and 2) and the second valve closed position (e.g., as shown in FIG. 3), and a position of the transfer valve 118 between the first transfer valve position (e.g., as shown in FIG. 1) and the second transfer valve position (e.g., as shown in FIGS. 2 and 3). The transfer control system 120 can include a first transfer control valve 122 configured to provide a transfer control pressure to one or more first transfer pressure control lines 124 to control the first shutoff valve 110 and a second transfer control valve 126 configured to provide a second transfer control pressure to one or more second transfer pressure control lines 128 to control the second shutoff valve 114.

In certain embodiments, the transfer control system 100 can further include a controller 130 configured to control the first transfer control valve 122 and/or the second transfer control valve 126 to change the position of the transfer valve 118 along with one of the first shutoff valve 110 and the second shutoff valve 114.

With reference to FIG. 1, in a first mode, the controller 130 can be configured to control the first transfer control valve 122 to cause the first shutoff valve 110 to be in the first valve open position (e.g., as shown in FIGS. 1 and 3) to fluidly communicate the one or more first pressure control lines 104*a*, 104*b* to a first functional system 132, the second transfer control valve 126 to cause the second shutoff valve 114 to be in the second valve open position (e.g., as shown in FIGS. 1 and 2) to fluidly communicate the one or more second pressure control lines 108*a*, 108*b* to a second functional system 134, and the transfer valve 118 to be in the first transfer valve position (e.g., as shown in FIG. 1) to prevent fluid communication between the one or more first pressure output lines 112*a*, 112*b* and the one or more second pressure output lines 116*a*, 116*b*.

With reference to FIG. 2, in a second mode, the controller 130 can be configured to control the first transfer control valve 122 to cause the first shutoff 110 valve to be in the first valve closed position (e.g., as shown in FIG. 2) and to prevent fluid communication between the one or more first pressure control lines 104*a*, 104*b* and the first functional system 132, the transfer valve 118 to be in the second transfer valve position (e.g., as shown in FIGS. 2 and 3) to fluidly communicate the one or more second pressure control lines 104*a*, 104*b* to the first functional system 132 via the one more first pressure output lines 112*a*, 112*b*, and the second transfer valve 126 to cause the second shutoff valve 114 to be in the second valve open position (e.g., as shown in FIGS. 1 and 2) to fluidly communicate the one or more second pressure control lines 108*a*, 108*b* to the second functional system 134.

With reference to FIG. 3, in a third mode, the controller 130 can be configured to control the first transfer valve 122 to cause the first shutoff valve 110 to be in the first valve open position (e.g., as shown in FIGS. 1 and 3) to fluidly communicate the one or more first pressure control lines 104*a*, 104*b* to the first functional system 132, the second transfer valve 126 to cause the second shutoff valve 114 to be in the second valve closed position (e.g., as shown in FIG. 3) to prevent fluid communication between the one or more second pressure control lines 108*a*, 108*b* and the second functional system 134, and the transfer valve 118 to be in the second transfer valve position (e.g., as shown in FIGS. 2 and 3) to fluidly communicate the one or more first pressure control lines 104*a*, 104*b* to the second functional system 134 via the one or more second pressure output lines 118*a*, 118*b*.

In certain embodiments, the transfer valve 118 can be configured to block pressure between the one or more first pressure output lines 112*a*, 112*b* and the one or more second pressure output lines 118*a*, 118*b* (e.g., as shown in FIG. 1). In certain embodiments, the first controllable valve 102 and the second controllable valve 104 are electro-hydraulic servo valves (EHSVs). In certain embodiments, the first transfer control valve 122 can be a first solenoid and the second transfer control valve 126 can be a second solenoid.

With continued reference to FIGS. 1-3, in certain embodiments, the system 100 can further include an intermediate control line 136 between the one or more first transfer pressure control lines 124 and the one or more second transfer pressure control lines 128 such that the one or more first transfer pressure control lines 124 are connected to a first portion 138 of the first shutoff valve 110 to provide the first control pressure to the first portion 138 of the first shutoff valve 110, the one or more second transfer pressure control lines 128 are connected to a first portion 140 of the second shutoff valve 114 to provide the second control pressure to the first portion 140 of the second shutoff valve 114, and the intermediate control line 136 is connected to a first portion 142 of the transfer valve 118 to provide the transfer control pressure to the first portion 142 of the transfer valve 118.

In certain embodiments, the system 100 can further include one or more input lines 144 in fluid communication with the first shutoff valve 110 and the second shutoff valve 114 configured to be at a supply pressure. The system 100 can also include an input orifice 146 in fluid communication with and disposed between the one or more input lines 144 and the intermediate control line 136 such that the input orifice 146 is configured to restrict flow between the one or more input lines 144 and the intermediate control line 136. The system 100 can also include a first control orifice 148 in fluid communication with and disposed between the intermediate control line 136 and the one or more first transfer pressure control lines 124 such that the first control orifice 148 is configured to restrict flow between the intermediate control line 136 and the one or more first transfer pressure control lines 124. The system 100 can further include a second control orifice 150 in fluid communication with and disposed between the intermediate control line 136 and the one or more second transfer pressure control lines 128 such that the second control orifice 150 is configured to restrict flow between the intermediate control line 136 and the one or more second transfer pressure control lines 128.

In certain embodiments, the system 100 can further include one or more return control lines 152 in fluid communication with the first controllable valve 102 and the second controllable valve 106 configured to be at a return pressure. The first solenoid 122 can be in fluid communication with and disposed between the one or more first transfer pressure control lines 124 and the one or more return lines 152 and configured to selectively communicate the one or more first transfer control lines 124 and the one or more return lines 152. The second solenoid 126 can be in fluid communication with and disposed between the one or more second transfer pressure control lines 128 and the one or more return control lines 152 and configured to selectively communicate the one or more second transfer control lines 128 and the one or more return lines 152.

In certain embodiments, the controller 130 can be configured to command the first solenoid 122 and the second solenoid 126 to be in a first state (e.g., closed) in the first mode (e.g., as shown in FIG. 1), the first solenoid to be in a second state (e.g., open) and the second solenoid 126 to be in the first state in the second mode (e.g., as shown in FIG. 2), and the second solenoid 126 to be in the second state and the first solenoid 122 to be in the first state in the third mode (e.g., as shown in FIG. 3). The first state can be a closed state and the second state can be an open state, such that in the first mode, the first solenoid 122 and the second solenoid 126 are in the closed state and the one or more first transfer control pressure lines 124, the one or more second transfer control pressure lines 128, and the intermediate control line 136 are all at a supply pressure from the one or more input lines 144 thereby holding the first shutoff valve 110 in the first valve open position (e.g., as shown in FIGS. 1 and 3), the second shutoff valve 114 in the second valve open position (e.g., as shown in FIGS. 1 and 2), and the transfer valve 118 in the first transfer valve position (e.g., as shown in FIG. 1). In certain embodiments, the supply pressure can be higher than the intermediate and the low pressure.

In the second mode (e.g., as shown in FIG. 2), the first solenoid 122 can be in the open state and the second solenoid 126 can be in the closed state, such that the one or more first transfer control lines 124 are in fluid communication with the return line 152 and at a return pressure of the return line 152 causing the first shut off valve 110 to move to the first valve closed position (e.g., as shown in FIG. 2), and the one or more second transfer pressure control lines 128 and the intermediate control line 136 are at an intermediate pressure configured to hold the second shutoff valve 114 in the second valve open position (e.g., as shown in FIGS. 1 and 2) but to cause the transfer valve 118 to move to the second transfer valve position (e.g., as shown in FIGS. 2 and 3). The intermediate pressure can provide enough pressure to maintain the second shutoff valve 126 in the second valve open position, but not enough pressure to keep the transfer valve 118 in the first transfer valve position.

In the third mode (e.g., as shown in FIG. 3), the first solenoid 122 can be in the closed stated and the second solenoid 126 can be in the open state, such that the one or more first transfer pressure control lines 124 and the intermediate pressure control line 136 are at the intermediate pressure and the one or more second transfer control lines 128 are at the return pressure of the return line 152 causing the first shutoff valve 110 to move to the first valve open position (e.g., as shown in FIGS. 1 and 3), the second shutoff valve 114 to move to the second valve closed position (e.g., as shown in FIG. 3), and the transfer valve 118 to move to the second transfer valve position (e.g., as shown in FIGS. 2 and 3). The intermediate pressure can provide enough pressure to maintain the first shutoff valve 110 in the first open valve position, but not enough to keep the transfer valve 118 in the first transfer valve position.

In certain embodiments, the first functional system 132 and the second functional system 134 can each include a plurality of actuators. In certain embodiments, the supply pressure can be a high pressure, the return pressure can be a low pressure, and the intermediate pressure can be between the supply pressure and the return pressure. In certain embodiments, the supply pressure can be a low pressure, the return pressure can be a high pressure, and the intermediate pressure can be between the supply pressure and the return pressure. The terms "supply" and "return" as used herein are not intended to denote a necessary directionality or a relative pressure. For example, the supply pressure can be a high pressure, and the return can be a low pressure, or the supply pressure can be a low pressure and the return pressure can be a high pressure. One having ordinary skill in the art appreciates how to modify the disclosed embodiments to arrive at a similar functional system with either relative pressure configuration in view of this disclosure.

Figure 4:
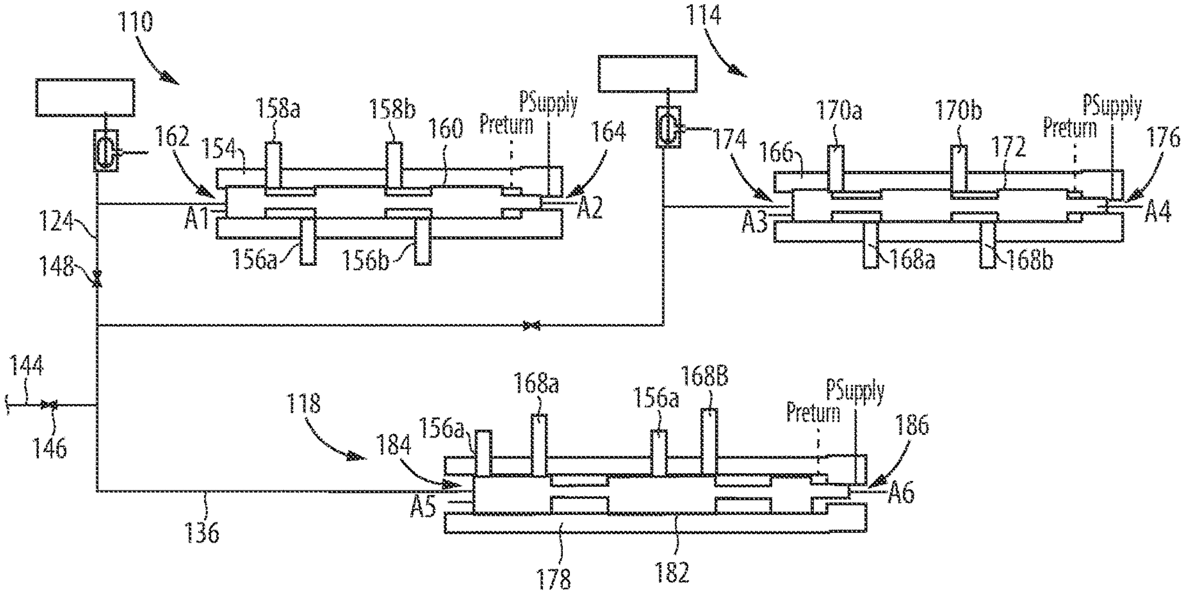
FIG. 4 is a cross-sectional view of an embodiment of a first shutoff valve housing, a second shutoff valve housing, and a transfer valve housing in accordance with this disclosure, showing an embodiment of a system in a first mode.
Figure 5:
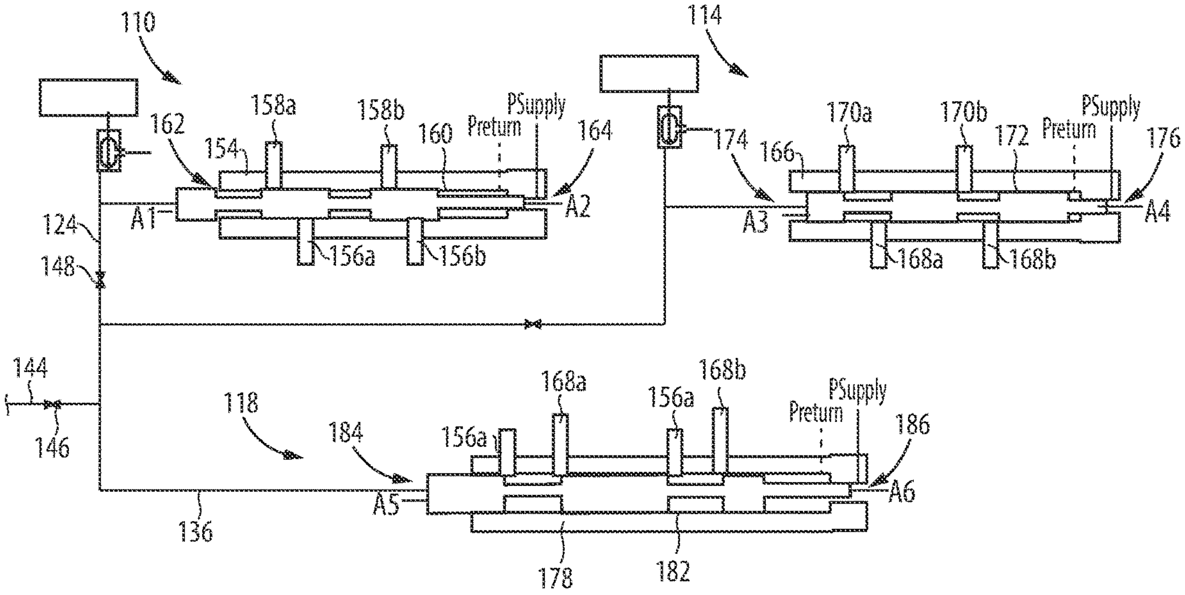
FIG. 5 is a cross-sectional view of the first shutoff valve, the second shutoff valve, and the transfer valve of FIG. 4, showing the system in a second mode.
Figure 6:
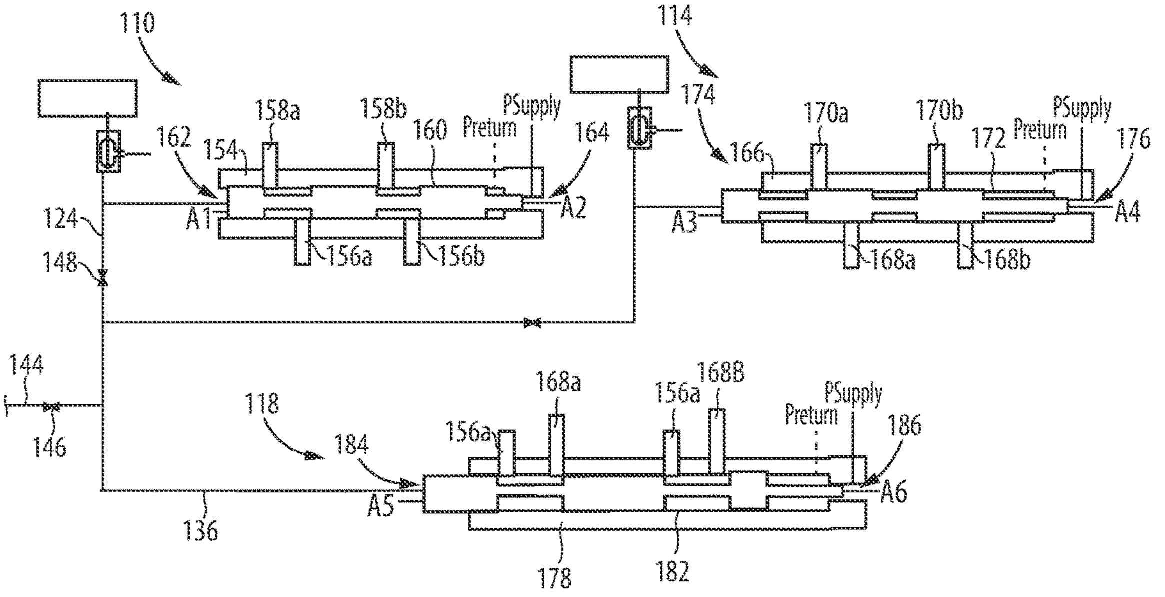
FIG. 6 is a cross-sectional view of the first shutoff valve, the second shutoff valve, and the transfer valve of FIG. 4, showing the system in a third mode.

With reference to FIGS. 4-6, in certain embodiments, the first shutoff valve 110 can include a first shutoff valve sleeve 154. The first shutoff valve sleeve 154 can include one or more first functional system ports 156*a*, 156*b* configured to fluidly connect to the one or more first pressure output lines 112*a*, 112*b*, one or more the first shutoff valve ports 158*a*, 158*b* configured to fluidly connect to the one or more first pressure control lines 104*a*, 104*b*, and a first shutoff valve spool 160 having a first end 162 with a first area A1 and a second end 164 with a second area A2 such that the first area A1 is greater than the second area A2. The first end 162 can be in fluid communication with the first transfer pressure control line 124 and the second end 164 can be in fluid communication with a biasing pressure (e.g., the supply pressure via the one or more input lines 144). The first shutoff valve spool 160 can be configured to move within the first shutoff valve sleeve 154 between the first open position and the first closed position to selectively communicate the one or more first functional system ports 156*a*, 156*b* with the one or more first shutoff valve ports 158*a*, 158*b* as a function of a pressure differential between the first area A1 and the second area A2 of the first shutoff valve 110. When the first area A1 of the first shutoff valve 110 is at the supply pressure or the intermediate pressure, the first shutoff valve 110 can be configured to be in the first open position and when the first area A1 of the first shutoff valve 110 is at the return pressure the first shutoff valve 110 can be configured to be in the first closed position. The return line 152 provides the return pressure to the second end 164 of the first shutoff valve 110.

In certain embodiments, the second shutoff valve 114 can include a second shutoff valve sleeve 166. The second shutoff valve sleeve 166 can include one or more second functional system ports 168*a*, 168*b* configured to fluidly connect to the one or more second pressure output lines 116*a*, 116*b*, one or more the second shutoff valve ports 170*a*, 170*b* configured to fluidly connect to the one or more second pressure control lines 108*a*, 108*b*, and a second shutoff valve spool 172 having a first end 174 with a first area A3 and a second end 176 with a second area A4 such that the first area A3 is greater than the second area A4. The first end 174 can be in fluid communication with the second transfer pressure control line 128 and the second end 174 can be in fluid communication with the biasing pressure (e.g., the supply pressure via the one or more input lines 144). The second shutoff valve spool 172 can be configured to move within the second shutoff valve sleeve 166 between the second open position and the second closed position to selectively communicate the one or more second functional system ports 168*a*, 168*b* with the one or more second shutoff valve ports 170*a*, 170*b* as a function of a pressure differential between the first area A3 and the second area A4 of the second shutoff valve 114 such that when the first area A3 of the second shutoff valve 114 is at the supply pressure and the intermediate pressure the second shutoff valve 114 is in the first open position and when the first area A3 of the second shutoff valve 114 is at the low pressure the first shutoff valve 110 is in the first closed position. The first area A1 of the first shutoff valve 110 can be the same or different from the first area A3 of the second shutoff valve 114. The second area A2 of the first shutoff valve 110 can be the same or different from the second area A4 of the second shutoff valve 114.

In certain embodiments, the transfer valve 118 can include a transfer valve sleeve 178. The transfer valve sleeve 178 can include one or more transfer control ports 180*a*, 180*b* configured to connect to the one or more first pressure output lines 112*a*, 112*b* and/or the one or more second output pressure lines 116*a*, 116*b* transfer pressure control lines to be in fluid communication with the transfer valve 118 and a transfer valve spool 182 having a first end 184 with a first area A5 and a second end 186 with a second area A6 such that the first area A5 is greater than the second area A6. The first end 184 can be in fluid communication with the intermediate line 136 and the second end 186 can be in fluid communication with the biasing pressure. The transfer valve spool 182 can be configured to move within the transfer valve sleeve 178 between the second transfer valve position and the second transfer position to selectively communicate the one or more first functional system ports 156*a*, 156*b* with the one or more second shutoff valve ports 170*a*, 170*b* or the one or more second functional system ports 168*a*, 168*b* with the one or more first shutoff valve ports 158*a*, 158*b* as a function of a pressure differential between the first area A5 and the second area A6 of the transfer valve 118 such that when the first area A5 of the transfer valve 118 is at the supply pressure the transfer valve 118 is in the first transfer valve position and when the first area A5 of the transfer valve is at the intermediate and low pressure the transfer valve is in the second transfer valve position. The first areas A1, A3, and A5 can be the same.

In accordance with at least one aspect of this disclosure, a system can include a first controllable valve configured to output a first control pressure on one or more first pressure control lines, a second controllable valve configured to output a second control pressure on one or more second pressure control lines, and a valve assembly. The valve assembly can be configured to direct the first control pressure to a first functional system and the second control pressure to a second functional system in a first state, direct the first control pressure to both of the first functional system and the second functional system in a second state, and direct the second control pressure to both of the first functional system and the second functional system in a third state. In certain embodiments, the transfer control system can be configured to control the valve assembly to be in one of the first state, the second state, or the third state.

In certain embodiments, three two positon valves (e.g., the first shutoff valve 110, the second shutoff valve 114, and the transfer valve 118) can be used to transfer control of a plurality actuators between the first controllable valve 102 and the second controllable valve 106 (e.g., EHSVs). Each of the first controllable valve 102 and the second controllable valve 106 can control a number of total actuators in the first mode, and the first controllable valve 102 and the second controllable valve 106 are in use at the same time. Each of the first controllable valve 102 and the second controllable valve 106 has a respective transfer valve (e.g., the first shutoff valve 110 and the second shutoff valve 114) that either allows flow from the first controllable valve 102 and the second controllable valve 106 or shuts it off. Downstream, there is a third transfer valve (e.g., the transfer valve 118) that either disallows cross flow or allows cross flow between the first transfer valve 110 and the second transfer valve 114. The system 100 is set up so that if one of the first controllable valve 102 or the second controllable valve 106 fails, the controller 130 commands a respective solenoid to shut off flow from the failed controllable valve and simultaneously the downstream cross flow valve (e.g., transfer valve 118) will be triggered to open so that the remaining controllable valve to control the entire system.

In certain embodiments, position sensors (e.g., LVDTs) can be included on the actuators. In certain embodiments, there could be a thrust change that is not expected.

In certain embodiments, the diameter ratios (e.g., between the first and second areas) and/or biases can be controlled to time the cascading of the valves as desired, e.g., the transfer valve 118 can switch before first shutoff valve 110, or vice versa, in the second mode depending on downstream systems and how they would react. In certain embodiments, a spring can be used to bias the transfer valve 118 more than the first shutoff valve 110 and the second shutoff valve 114.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:

a first controllable valve configured to output a first control pressure on one or more first pressure control lines;

a second controllable valve configured to output a second control pressure on one or more second pressure control lines;

a first shutoff valve in fluid communication with the first controllable valve via the one or more first pressure control lines, wherein the first shutoff valve is connected to one or more first pressure output lines, wherein the first shutoff valve is configured to move between:

a first valve open position such that the first shutoff valve is configured to fluidly communicate the one or more first pressure control lines with a first functional system via the one or more first pressure output lines; and a first valve closed position such that the first shutoff valve is configured to restrict fluid communication of the one or more first pressure control lines with the first functional system via the one or more first pressure output lines;

a second shutoff valve in fluid communication with the second controllable valve via the one or more second pressure control lines, wherein the second shutoff valve is connected to one or more second pressure output lines, wherein the second shutoff valve is configured to move between:

a second valve open position such that the second shutoff valve is configured to fluidly communicate the one or more second pressure control lines with a second functional system via the one or more second pressure output lines; and a second valve closed position such that the second shutoff valve is configured to restrict fluid communication of the one or more second pressure control lines with the second functional system via the one or more second pressure output lines; and a transfer valve in fluid communication between the one or more first pressure output lines and the one or more second pressure output lines, wherein the transfer valve is configured to move between:

a first transfer valve position wherein the transfer valve is configured to restrict fluid communication between the one or more first pressure output lines and the one or more second pressure output lines; and a second transfer valve position wherein the transfer valve is configured to fluidly communicate the one or more first pressure output lines with the one or more second pressure output lines.

2. The system of claim 1, further comprising a transfer control system configured to control a position of the first shutoff valve between the first valve open position and the first valve closed position, a position of the second shutoff valve between the second valve open position and the second valve closed position, and a position of the transfer valve between the first transfer valve position and the second transfer valve position.

3. The system of claim 1, wherein the transfer valve is configured to block pressure between the one or more first pressure output lines and the one or more second pressure output lines.

4. The system of claim 1, wherein the first controllable valve and the second controllable valve are electro-hydraulic servo valves (EHSVs).

5. A system, comprising:

a first controllable valve configured to output a first control pressure on one or more first pressure control lines;

a second controllable valve configured to output a second control pressure on one or more second pressure control lines;

a first shutoff valve in fluid communication with the first controllable valve via the one or more first pressure control lines, wherein the first shutoff valve is connected to one or more first pressure output lines, wherein the first shutoff valve is configured to move between:

a first valve open position such that the first shutoff valve is configured to fluidly communicate the one or more first pressure control lines with the one or more first pressure output lines; and a first valve closed position such that the first shutoff valve is configured to restrict fluid communication of the one or more first pressure control lines with the one or more first pressure output lines;

a second shutoff valve in fluid communication with the second controllable valve via the one or more second pressure control lines, wherein the second shutoff valve is connected to one or more second pressure output lines, wherein the second shutoff valve is configured to move between:

a second valve open position such that the second shutoff valve is configured to fluidly communicate the one or more second pressure control lines with the one or more second pressure output lines; and a second valve closed position such that the second shutoff valve is configured to restrict fluid communication of the one or more second pressure control lines with the one or more second pressure output lines;

a transfer valve in fluid communication between the one or more first pressure output lines and the one or more second pressure output lines, wherein the transfer valve is configured to move between:

a first transfer valve position wherein the transfer valve is configured to restrict fluid communication between the one or more first pressure output lines and the one or more second pressure output lines; and a second transfer valve position wherein the transfer valve is configured to fluidly communicate the one or more first pressure output lines with the one or more second pressure output lines; and a transfer control system configured to control a position of the first shutoff valve between the first valve open position and the first valve closed position, a position of the second shutoff valve between the second valve open position and the second valve closed position, and a position of the transfer valve between the first transfer valve position and the second transfer valve position, wherein the transfer control system includes:

a first transfer control valve configured to provide a transfer control pressure to one or more first transfer pressure control lines to control the first shutoff valve; and a second transfer control valve configured to provide a second transfer control pressure to one or more second transfer pressure control lines to control the second shutoff valve.

6. The system of claim 5, wherein the transfer control system further includes a controller configured to control the first transfer control valve and/or the second transfer control valve to change the position of the transfer valve along with one of the first shutoff valve and the second shutoff valve.

7. The system of claim 6, wherein in a first mode, the controller is configured to control the first transfer control valve to cause the first shutoff valve to be in the first valve open position to fluidly communicate the one or more first pressure control lines to the first functional system, the second transfer control valve to cause the second shutoff valve to be in the second valve open position to fluidly communicate the one or more second control lines to the second functional system, and the transfer valve to be in the first transfer valve position to prevent fluid communication between the one or more first pressure control lines and the one or more second control lines.

8. The system of claim 7, wherein in a second mode, the controller is configured to control the first transfer control valve to cause the first shutoff valve to be in the first valve closed position and to prevent fluid communication between the one or more first pressure control lines and the first functional system, the transfer valve to be in the second transfer valve position to fluidly communicate the one or more second pressure control lines to the first functional system via the one more first pressure output lines, and the second transfer control valve to cause the second shutoff valve to be in the second valve open position to fluidly communicate the one or more second pressure control lines to the second functional system.

9. The system of claim 8, wherein in a third mode, the controller is configured to control the first transfer control valve to cause the first shutoff valve to be in the first valve open position to fluidly communicate the one or more first pressure control lines to the first functional system, the second transfer control valve to cause the second shutoff valve to be in the second valve closed position to prevent fluid communication between the one or more second pressure control lines and the second functional system, and the transfer valve to be in the second transfer valve position to fluidly communicate the one or more first pressure control lines to the second functional system via the one or more second pressure output lines.

10. The system of claim 5, wherein the first transfer control valve is a first solenoid and the second transfer control valve is a second solenoid.

11. The system of claim 10, further comprising an intermediate control line between the one or more first transfer pressure control lines and the one or more second transfer pressure control lines, wherein the one or more first transfer pressure control lines are connected to a first portion of the first shutoff valve to provide the first control pressure to the first portion of the first shutoff valve, wherein the one or more second transfer pressure control lines are connected to a first portion of the second shutoff valve to provide the second control pressure to the first portion of the second shutoff valve, and wherein the intermediate control line is connected to a first portion of the transfer valve to provide the transfer control pressure to the first portion of the transfer valve.

12. The system of claim 11, further including:

one or more input lines in fluid communication with the first shutoff valve and the second shutoff valve configured to be at a supply pressure;

an input orifice in fluid communication with and disposed between the one or more input lines and the intermediate control line such that the input orifice is configured to restrict flow between the one or more input lines and the intermediate control line;

a first control orifice in fluid communication with and disposed between the intermediate control line and the one or more first transfer pressure control lines such that the first control orifice is configured to restrict flow between the intermediate control line and the one or more first transfer pressure control lines; and a second control orifice in fluid communication with and disposed between the intermediate control line and the one or more second transfer pressure control lines such that the second control orifice is configured to restrict flow between the intermediate control line and the one or more second transfer pressure control lines.

13. The system of claim 12, further including:

one or more return control lines;

wherein the first solenoid is in fluid communication with and disposed between the one or more first transfer pressure control lines and the one or more return lines and configured to selectively communicate the one or more first transfer control lines and the one or more return lines; and wherein the second solenoid is in fluid communication with and disposed between the one or more second transfer pressure control lines and the one or more return control lines and configured to selectively communicate the one or more second transfer control lines and the one or more return lines.

14. The system of claim 13, wherein the controller is configured to command the first solenoid and the second solenoid to be in a first state in the first mode, wherein the controller is configured to command the first solenoid to be in a second state and the second solenoid to be in the first state in the second mode, and wherein the controller is configured to command the second solenoid to be in the second state and the first solenoid to be in the first state in the third mode.

15. The system of claim 14, wherein the first state is a closed state and the second state is an open state, such that in the first mode, the first solenoid and the second solenoid are in the closed state and the one or more first transfer control pressure lines, the one or more second transfer control pressure lines, and the intermediate control line are all at a supply pressure from the one or more input lines thereby holding the first shutoff valve in the first valve open position, the second shutoff valve in the second valve open position, and the transfer valve in the first transfer valve position.

16. The system of claim 15, wherein in the second mode, the first solenoid is in the open state and the second solenoid is in the closed state, such that the one or more first transfer control lines are in fluid communication with the return line and at a return pressure of the return line causing the first shut off valve to move to the first valve closed position, and the one or more second transfer pressure control lines and the intermediate control line are at an intermediate pressure configured to hold the second shutoff valve in the second valve open position but to cause the transfer valve to move to the second transfer valve position.

17. The system of claim 16, wherein in the third mode, the first solenoid is in the closed stated and the second solenoid is in the open state, such that the one or more first transfer pressure control lines and the intermediate pressure control line are at the intermediate pressure and the one or more second transfer control lines are at the return pressure of the return line causing the first shutoff valve to move to the first valve open position, the second shutoff valve to move to the second valve closed position, and the transfer valve to move to the second transfer valve position.

18. The system of claim 17, wherein the supply pressure is a high pressure, wherein the return pressure is a low pressure, wherein the intermediate pressure is between the supply pressure and the return pressure.

19. A system, comprising:

a first controllable valve configured to output a first control pressure on one or more first pressure control lines;

a second controllable valve configured to output a second control pressure on one or more second pressure control lines;

a first shutoff valve in fluid communication with the first controllable valve via the one or more first pressure control lines, wherein the first shutoff valve is fluidly connected to a first functional system via one or more first pressure output lines;

a second shutoff valve in fluid communication with the second controllable valve via the one or more second pressure control lines, wherein the second shutoff valve is fluidly connected to a second functional system via one or more second pressure output lines; and a valve assembly in fluid communication between the one or more first pressure output lines and the one or more second pressure output lines, the valve assembly configured to:

direct the first control pressure to the first functional system and the second control pressure to the second functional system in a first state;

direct the first control pressure to both of the first functional system and the second functional system in a second state; and direct the second control pressure to both of the first functional system and the second functional system in a third state.

20. The system of claim 19, further comprising a transfer control system configured to control the valve assembly to be in one of the first state, the second state, or the third state.

* * * * *